United States Patent [19]
Primisser et al.

[11] Patent Number: 6,060,843
[45] Date of Patent: May 9, 2000

[54] METHOD AND CONTROL CIRCUIT FOR REGULATION OF THE OPERATIONAL CHARACTERISTICS OF GAS DISCHARGE LAMPS

[75] Inventors: Norbert Primisser, Fraxern; Siegfried Luger, Dornbirn, both of Austria

[73] Assignee: Tridonic Bauelemente GmbH, Dornbirn, Austria

[21] Appl. No.: 09/101,682

[22] PCT Filed: Jan. 16, 1997

[86] PCT No.: PCT/EP97/00184

§ 371 Date: Jul. 14, 1998

§ 102(e) Date: Jul. 14, 1998

[87] PCT Pub. No.: WO97/27726

PCT Pub. Date: Jul. 31, 1997

[30] Foreign Application Priority Data

Jan. 26, 1996 [DE] Germany .......................... 196 02 765
Apr. 2, 1996 [DE] Germany .......................... 196 13 257

[51] Int. Cl.$^7$ ...................................................... G05F 1/00
[52] U.S. Cl. .......................... 315/291; 315/307; 315/194; 315/224
[58] Field of Search ................................. 315/307, 224, 315/194, 200 R, 219, 291, 297, 306

[56] References Cited

U.S. PATENT DOCUMENTS

| | | | |
|---|---|---|---|
| 5,495,405 | 2/1996 | Fujimura et al. | 363/133 |
| 5,563,477 | 10/1996 | Ribarich | 315/307 |
| 5,583,402 | 12/1996 | Moisin et al. | 315/307 |
| 5,589,742 | 12/1996 | Ueda | 315/307 |
| 5,600,211 | 2/1997 | Luger | 315/307 |
| 5,717,295 | 2/1998 | Nerone | 315/307 |
| 5,739,643 | 4/1998 | Usui | 315/241 S |

*Primary Examiner*—Don Wong
*Assistant Examiner*—Tuyet T. Vo
*Attorney, Agent, or Firm*—Fitzpatrick, Cella, Harper & Scinto

[57] ABSTRACT

Gas discharge lamps are for regulated in a manner that is not affected by parasitic capacitances, such as line capacitances, by measuring current which passes through the lamp, calculating an active component of the measured current based on its phase in relation to a reference or by a comparison of the relative phases of the measured current and a voltage applied to the lamp, and regulating the lamp operation based on the active component.

29 Claims, 7 Drawing Sheets

| CABLE TYPE | LENGTH l = 2m | | l = 1m | | l = 0.5m | |
|---|---|---|---|---|---|---|
| | f=100kHz | f=10kHz | f=100kHz | f=10kHz | f=100kHz | f=10kHz |
| YMM 4x2.5 SILICON | 190pF | | 94pF | | 42pF | |
| YMM 4x2.5 STANDARD | 217pF | 244pF | 110pF | 124pF | 52pF | 59pF |
| YMM 4x1.5 SILICON | 190pF | | 164pF | | 77pF | |
| YMM 4x0.75 STANDARD | 250pF | | 122pF | 140pF | 57pF | 59pF |
| YMM 4x1.5 STANDARD | 233pF | 250pF | 107pF | 117pF | 50pF | 54pF |
| 4xYe 0.5 IN TUBE 6.4mm | 135pF | 146pF | 60pF | 64pF | 28pF | |

METHOD AND CONTROL CIRCUIT FOR REGULATION OF THE OPERATIONAL CHARACTERISTICS OF GAS DISCHARGE LAMPS

BACKGROUND OF THE INVENTION

1. Field of the Invention

The present invention relates to a method and an electronic control circuit, such as for example an electronic control gear, for regulating the operating behaviour, in particular the brightness, of gas discharge lamps.

2. Description of the Related Art

Figure 5:
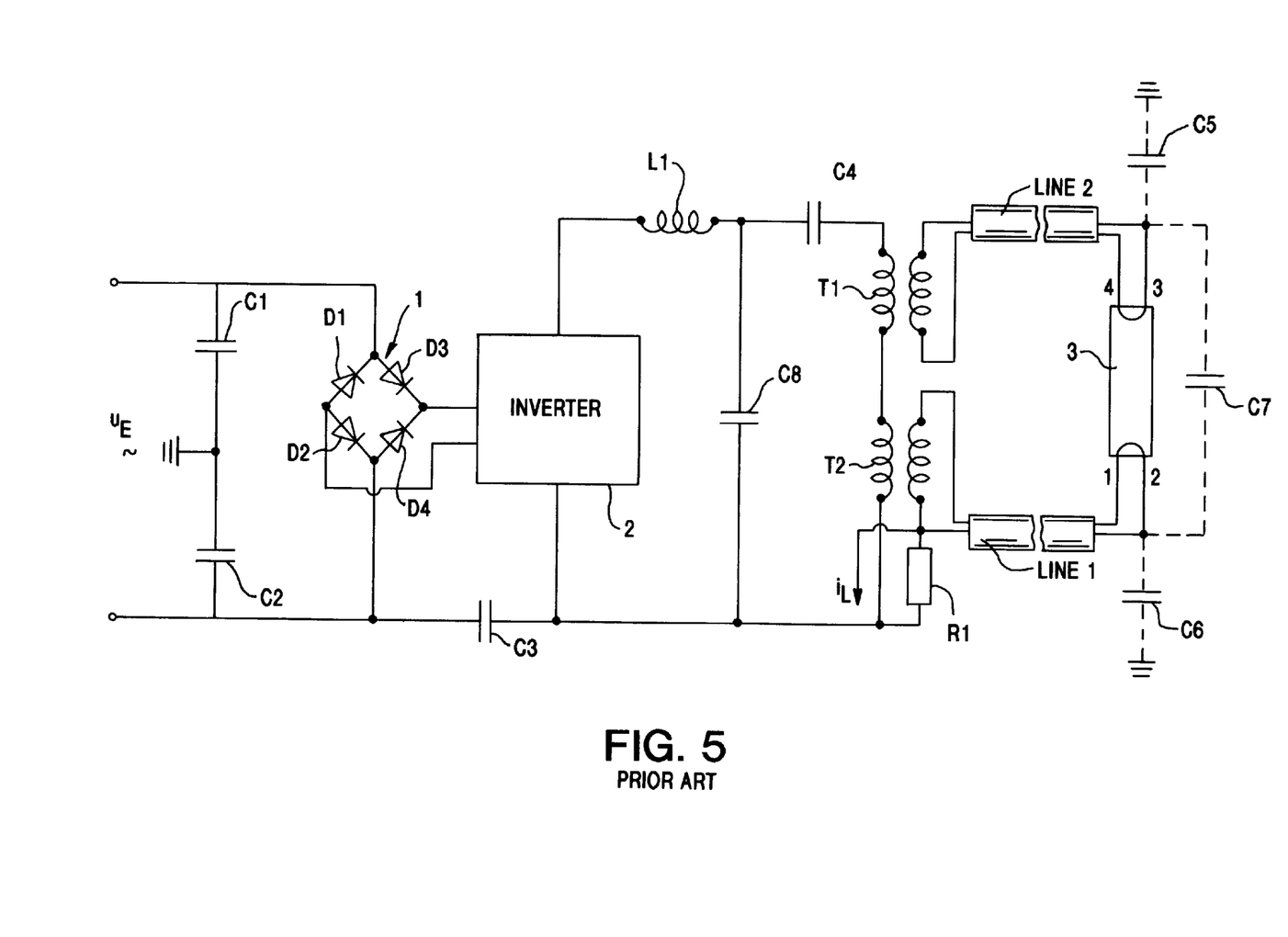
FIG. 5 illustrates a known electronic control gear.

FIG. 5 shows, for example, the construction of a known electronic control gear for controlling a gas discharge lamp 3 as disclosed in EP-A1-0 490 329. EP-A1-0 338 109 has disclosed an electronic control gear similar to the circuit arrangement shown in FIG. 5 in which however, in place of heating transformers T1 and T2 illustrated in FIG. 5, an ignition or heating capacitor connected in parallel to the lamp coils is used.

In accordance with FIG. 5, a rectifier 1, comprising diodes D1–D4 connected to form a bridge circuit, is connected via capacitors C1 and C2 to an a.c. voltage source $u_E$. The capacitors C1 and C2 are part of a radio interference suppression arrangement. The input a.c. voltage $u_E$ rectified by the rectifier 1 is fed to an inverter 2 which generally comprises two alternately switched semiconductor switches. The inverter 2 converts the line voltage rectified by the rectifier 1 into an output a.c. voltage. Here the output frequency and/or duty factor between the switch-on times of the semiconductor switches of the inverter 2 is/are variable. The output voltage of the inverter is fed to a load circuit comprising a series-resonance circuit consisting of a coil Li and a capacitor C8, a coupling capacitor C4, heating transformers T1 and T2 for the lamp coils, and the gas discharge lamp 3. The gas discharge lamp 3 is connected via wire conductors to heating transformers T1 and T2. The lamp current $i_L$ flowing across the gas discharge path of the gas discharge lamp 3 is tapped across a shunt resistor R1 and is normally used as regulating variable for the brightness of the gas discharge lamp 3, i.e. the frequency and/or duty factor of the inverter 2 is regulated as a function of the actual value of the lamp current $i_L$ in order to dim the brightness of the gas discharge lamp 3. The gas discharge lamp 3 is dimmed in that the output frequency f of the inverter 2 is increased. The initial ignition of the gas discharge lamp 3 takes place in that the output frequency of the inverter 2 is adapted to the resonance frequency of the series-resonance circuit comprising the coil L1 and the capacitor C8.

If, however, the lamp current $i_L$ is used as regulating variable, operating disturbances can occur due to excessively long connection lines between the terminals of the electronic control gear and the gas discharge lamp. This manifests in particular in the case of strong dimming, i.e. with low brightness of the gas discharge lamp. These operating disturbances are caused by capacitive influences of the wiring as parasitic capacitances C5 and C6 occur between the lines and earth and a parasitic capacitance C7 occurs between the lines. It can be seen from FIG. 5 that the capacitances C5 and C6 between the lines and earth only slightly in fluence the lamp current $i_L$ measured via the resistor R1 as the capacitive currents flowing across these capacitances C5 and C6 are conducted past the resistor R1 and the capacitance C6 of the line 2 is balanced to earth by the dimming c apacitor C3 relative to R1.

Figure 6:
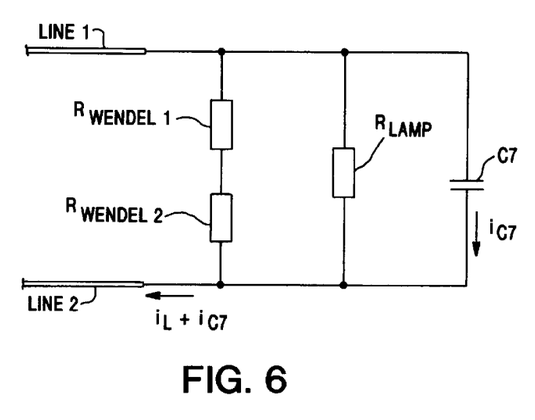
FIG. 6 is a simplified resistance equivalent circuit diagram of the lines shown in FIG. 5, the lamp and the parasitic line capacitance.

On the other hand, the capacitive current produced by the parasitic capacitance C7 between the lines is superimposed upon the lamp current $i_L$ measured via the shunt resistor R1. The resistance equivalent circuit diagram, shown in FIG. 6, of the lines with the gas discharge lamp 3 and the parasitic capacitance C7 shows that the shunt resistor R1 is supplied via the line 2 with the lamp current $i_L$ flowing across the lamp resistor $R_{Lampe}$ and the capacitive current $i_{C7}$ flowing across the parasitic capacitance C7. Thus not a purely ohmic current, but a current $i_L + i_{C7}$, shifted in phase relative to the lamp voltage as a function of the parasitic capacitance C7, flows across the shunt resistor R1.

As already mentioned, the current flowing across the resistor R1 is used to regulate the brightness of the gas discharge lamp 3. Here in particular the peak value of this current is measured, which peak value is compared with a predetermined setpoint value which is variable by means of the dimming setting, whereupon optionally the output frequency f or the duty factor d of the switches of the inverter of the electronic control gear is changed. If too high a lamp current is detected via the resistor R1, the inverter frequency f is increased so that the voltage across the heating capacitor C8 of the series oscillating circuit falls. In this case the gas discharge lamp connected in parallel with the capacitor C8 is connected to a lower voltage and thus emits less light.

However, in the case of the known circuit arrangement shown in FIG. 5 accurate regulation of the operating behaviour of the gas discharge lamp as a function of the lamp current measured via the resistor R1 is not possible, as the peak value of the sum current $i_L(t) + i_{c.7}(t)$, (compare FIG. 6) i.e. the sum of the lamp current iL flowing across the coil resistors $R_{Wendel\ 1}$ and $R_{Wendel\ 2}$ and the lamp resistor $R_{Lampe}$ of the gas discharge lamp 3 and the capacitive current $i_{C7}$ flowing across the parasitic capacitance C7, is actually measured via the resistor R1. As with increasing frequency, i.e. stronger dimming, the capacitive resistance of the parasitic capacitance C7 falls and the lamp resistance $R_{Lampe}$ remains constant, in the current measured via the resistor R1 the capacitive current component $i_{C7}$ increases in relation to the purely ohmic lamp current component $i_L$. This means that, with strong dimming, the electronic control gear detects an excessively high current across the resistor R1 and incorrectly interprets this excessive current as actual value of the lamp current $i_L$.

Figure 8:
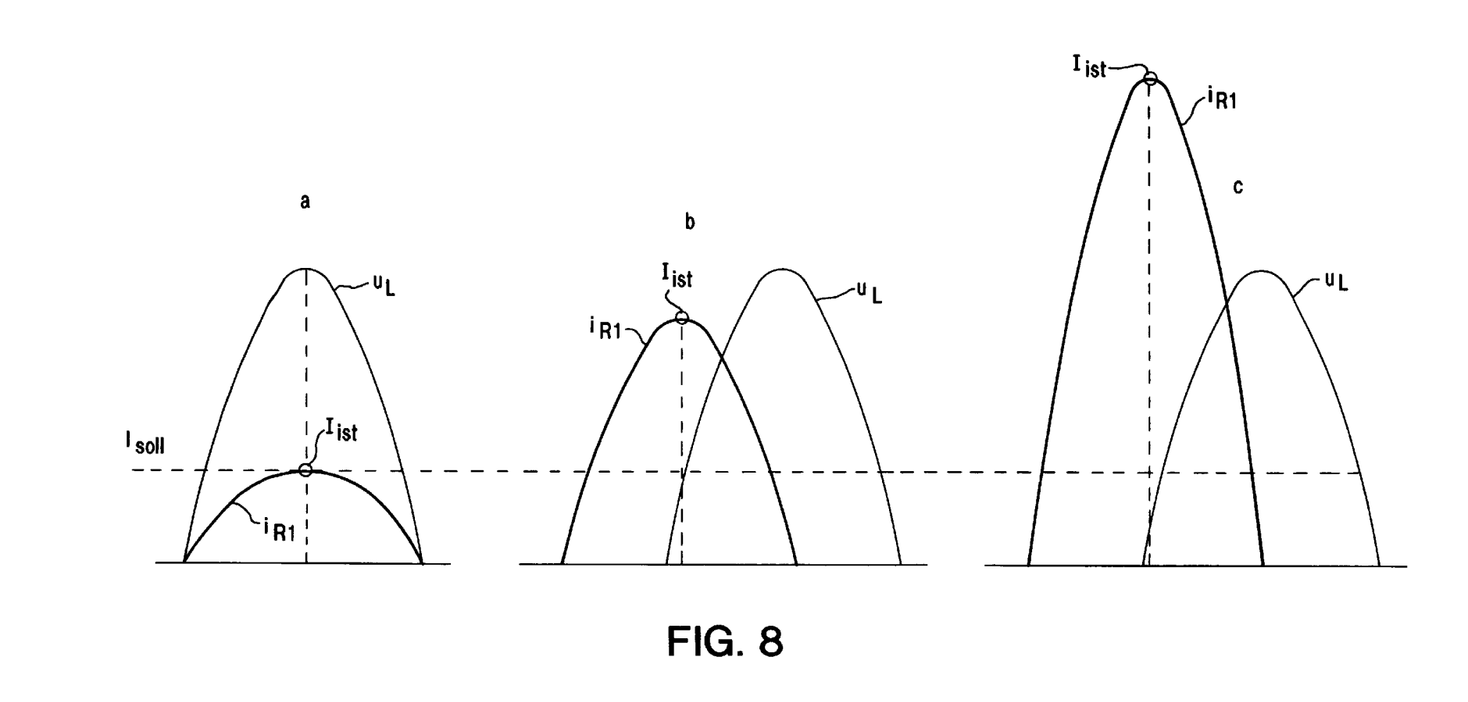
FIG. 8 shows current- and signal characteristics in explanation of the known regulation method.

This process is illustrated in FIG. 8, in which FIGS. 8a to 8c show different characteristics of the lamp voltage $u_L$ and the current $i_{R1}$ measured across the resistor R1, for different values of the line capacitance C7. FIG. 8a illustrates the ideal situation in which the parasitic line capacitance C7 is very small, so that the capacitive current component $i_{C7}$ of the current measured across the resistor R1 is negligibly small and this current measured across the resistor R1 substantially corresponds to the lamp current $i_L$. As in this case the current is substantially purely ohmic, the current is not shifted in phase compared to the lamp voltage $u_L$. As already described, usually the peak value of the current detected across the resistor R1 is measured. This peak value is compared, as actual value list, with a predetermined setpoint value $I_{soll}$ In the example illustrated in FIG. 8a the measured peak value $I_{ist}$ corresponds to the setpoint value $I_{soll}$ and therefore no regulation of the brightness of the gas discharge lamp 3 is required. FIG. 8b illustrates this process when an average line capacitance C7 occurs between the lines. It can be seen from FIG. 8b that, as a result of the capacitive current $i_{C7}$ flowing across the line capacitance C7, not only is the current $i_{R1}$ also shifted in phase relative to the lamp voltage $u_L$ but the measured peak value list is also distinctly increased compared to the situation illustrated in FIG. 8a. Therefore in the case of the signal characteristic illustrated in FIG. 8b the electronic control gear would recognise that the measured peak value $I_{ist}$, is greater than the measured setpoint value $I_{soll}$. The electronic control gear would therefore attempt to reduce this increased current again by increasing the frequency across the inverter 2, although this is opposed by the capacitive resistance—falling due to the rising frequency—of the parasitic capacitance C7, with the result that the capacitive component $i_{C7}$ of the current $i_{R1}$ measured across the shunt resistor R1 is increased. This cycle finally leads to the extinguishing of the lamp, although the extinguishing of the gas discharge lamp 3 by the electronic control gear cannot be ascertained by measurement of the current $i_{R1}$ flowing across the resistor R1 as a capacitive current $i_{C7}$ also flows when the lamp is extinguished via the parasitic capacitance C7. FIG. 8c illustrates corresponding signal characteristics for the occurrence of a high line capacitance value between the lines which connect the gas discharge lamp 3 to the electronic control gear. In the case of the signal characteristics illustrated in FIG. 8c, due to the distinctly increased capacitive current component $i_{C7}$ relative to the lamp current $i_L$, the resultant sum current $i_{R1}$ is distinctly increased again. The measurement error occurring as a result of the superimposition with the capacitive current $i_{C7}$ is greatest in the example illustrated in FIG. 8c.

Figure 7:
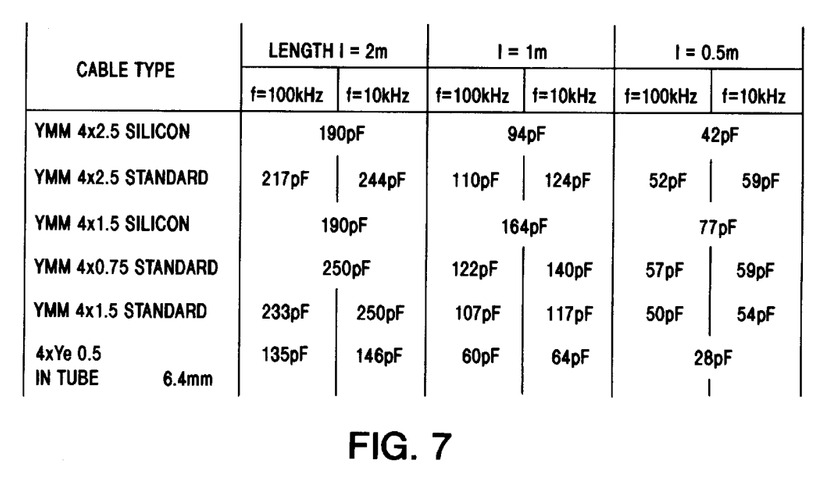
FIG. 7 shows example values of the line capacitance for different cable types, cable lengths and operating frequencies

It will be apparent from the previous description that due to the capacitive influences of the wiring, correct dimmer operation of the gas discharge lamp is not possible since, particularly in the case of strong dimming of the gas discharge lamp, the capacitive current $i_{C7}$ flowing across the line capacitance C7 is distinctly superimposed upon the lamp current $i_L$ actually to be measured. The previously employed method, in which the peak value of the current $i_{R1}$ flowing across the resistor R1 is measured, is therefore too inaccurate in the case of electronic control gears covering wide dimming ranges (between 100% and 1% brightness). For different cable types and different cable lengths l and for different operating frequencies f, FIG. 7 shows the value of the parasitic line capacitance C7 occurring between the lines. It can be seen from FIG. 7 that on the one hand the parasitic capacitance C7 rises with increasing cable length l and on the other hand a larger line capacitance occurs at a lower operating frequency f. The measurement results shown in FIG. 7 indicate that, for the line capacitance to have a small influence, light manufacturers would need to take into account a specified, maximum permissible length of the wiring. However, presetting of a maximum permissible wiring length is undesirable.

Therefore the object of the invention is to provide a method and a control circuit, in particular for the implementation of the method, for regulating and/or measuring the operating state of gas discharge lamps in which accurate regulation and/or measurement of the operating state is possible and it is unnecessary to take into account the wiring length between the gas discharge lamp and a series-connected electronic control gear.

In accordance with the invention it is proposed that only the active component of the lamp current be evaluated. In this way the influence of the capacitive current flowing across the parasitic line capacitance is eliminated and accurate regulation and/or measurement of the operating state is possible without the need to take the line length into account. In particular, the connected lamp can be accurately dimmed over wide dimming ranges.

Further advantageous developments of the invention are described hereinafter.

SUMMARY OF THE INVENTION

According to one aspect of the invention, there is provided a novel method for regulating the operating behavior of at least one gas discharge lamp, which is operated by means of an electronic control circuit. This novel method comprises the steps of: measuring current flowing through the lamp; calculating an active component of the measured current, which is uninfluenced by parasitic capacitance, by comparing the relative phases of the measured current and a voltage applied to the lamp; and regulating the operation of the lamp based on the calculated active component.

According to another aspect of the invention, there is provided a novel method for measuring and/or evaluating the operating behavior of at least one gas discharge lamp, which is operated by means of an electronic control circuit. This novel method comprises the steps of: measuring current flowing through the lamp; calculating an active component of the measured current, which is uninfluenced by parasitic capacitance, by ascertaining its phase in relation to a reference; and evaluating the operating state of said lamp based on the calculated active component.

According to a still further aspect of the invention, there is provided a novel apparatus for regulating the operating behavior of at least one gas discharge lamp, which is operated by means of an electronic control circuit. This novel apparatus comprises circuits for measuring current flowing through the lamp and for calculating an active component of the measured current, which is uninfluenced by parasitic capacitance, by ascertaining its phase in relation to a reference or by comparing the relative phases of the measured current and a voltage applied to the lamp; and a regulating circuit for regulating the operation of the lamp based on the calculated active component.

BRIEF DESCRIPTION OF THE DRAWINGS

In the following the invention will be explained in detail in the form of preferred exemplary embodiments. In the drawing.

DETAILED DESCRIPTION OF THE PREFERRED EMBODIMENTS

Figure 1:
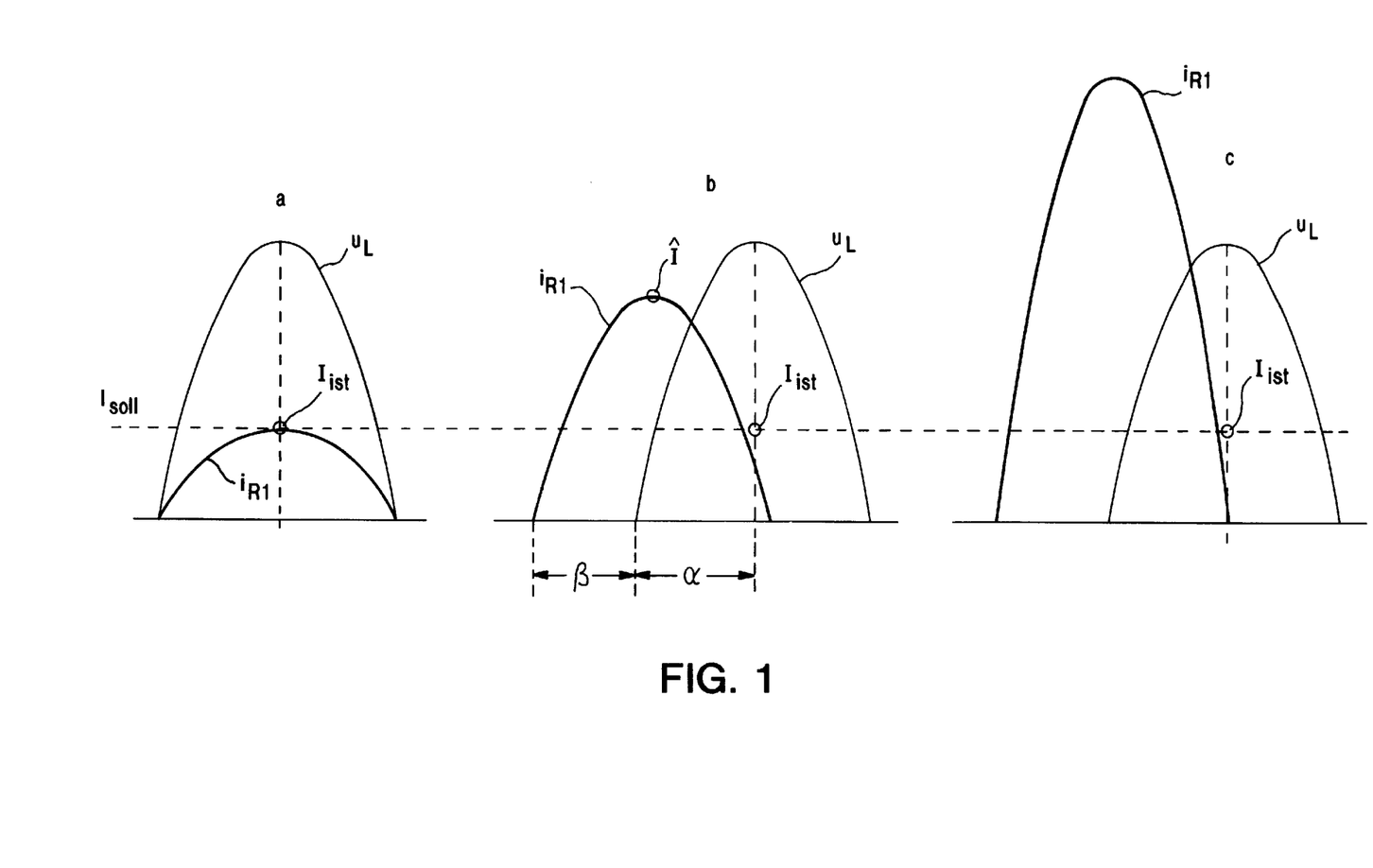
FIG. 1 shows current- and voltage characteristics of a first exemplary embodiment according to the invention.

FIG. 1 illustrates characteristics of the current $i_{R1}$ measured via the resistor R1 and of the lamp voltage $u_L$ for different values of the line capacitance C7 shown in FIG. 5. FIG. 1a shows the signal characteristics for a very small line capacitance value C7, so that the capacitive current $i_{C7}$ superimposed upon the actual lamp current $i_L$ and flowing across the line capacitance C7 is negligibly small. In this case no phase shift occurs between the current $i_{R1}$ measured across the resistor R1 and the lamp voltage $u_L$, and the current measured across the resistor R1 ideally corresponds to the lamp current $i_L$ actually to be measured. In this respect the signal characteristics illustrated in FIG. 1a do not differ from the signal characteristics illustrated in FIG. 8a. FIG. 1b shows signal characteristics for the situation in which an average line capacitance C7 forms between the lines shown in FIG. 5, so that the current measured across the resistor R1 is shifted in phase in relation to the lamp voltage $u_L$ and leads the lamp voltage $u_L$. In accordance with the invention, it is proposed that the current flowing across the resistor R1 be measured only when the lamp voltage $u_L$ has reached its peak value. For a purely sinusoidal current $i_{R1}$ the following formula thus applies:

$$I_{ist} = \hat{I} \cdot \sin(\alpha + \beta) \qquad (1)$$

wherein I corresponds to the peak value of the current measured across the resistor R1. However, for purely sinusoidal variables the following also applies:

$$\alpha = \pi/2 \qquad (2)$$

As:

$$\sin(\alpha + \pi/2) = \cos(\alpha) \qquad (3)$$

formula (1) is simplified into $$I_{ist} = \hat{I} \cdot \cos \beta \qquad (4).$$

For the extreme values $\beta = 0°$ and $\beta = 90°$ ($\pi/2$), $i_{R1}$ thus assumes the values $\hat{I}$ and zero.

When the peak value $\hat{I}$ of the current $i_{R1}$ measured across the resistor R1 is known, by measuring the phase difference between the current $i_{R1}$ and the lamp voltage $u_L$ it is thus possible to calculate the unadulterated actual value list at the time at which the lamp voltage $u_L$ has reached its positive peak value. FIG. 1c illustrates corresponding characteristics for a very large value of the line capacitance C7, so that the current $i_{R1}$ measured across the resistor R1 is distinctly increased and is distinctly shifted in phase compared to the lamp voltage $u_L$. Even in the event of such a strong influence of the capacitive current $i_{C7}$, flowing across the parasitic capacitance C7, in the method according to the invention the actual value $I_{ist}$, corresponding to the actual lamp current $i_L$ is always measured and therefore accurate regulation of the lamp brightness is possible even with strong dimming.

The method illustrated in FIG. 1 calculates the actual value $I_{ist}$, in fault-free manner only for purely sinusoidal current characteristics. However, this method can also be employed for other periodic curve characteristics although a uniform error always occurs.

Figure 2:
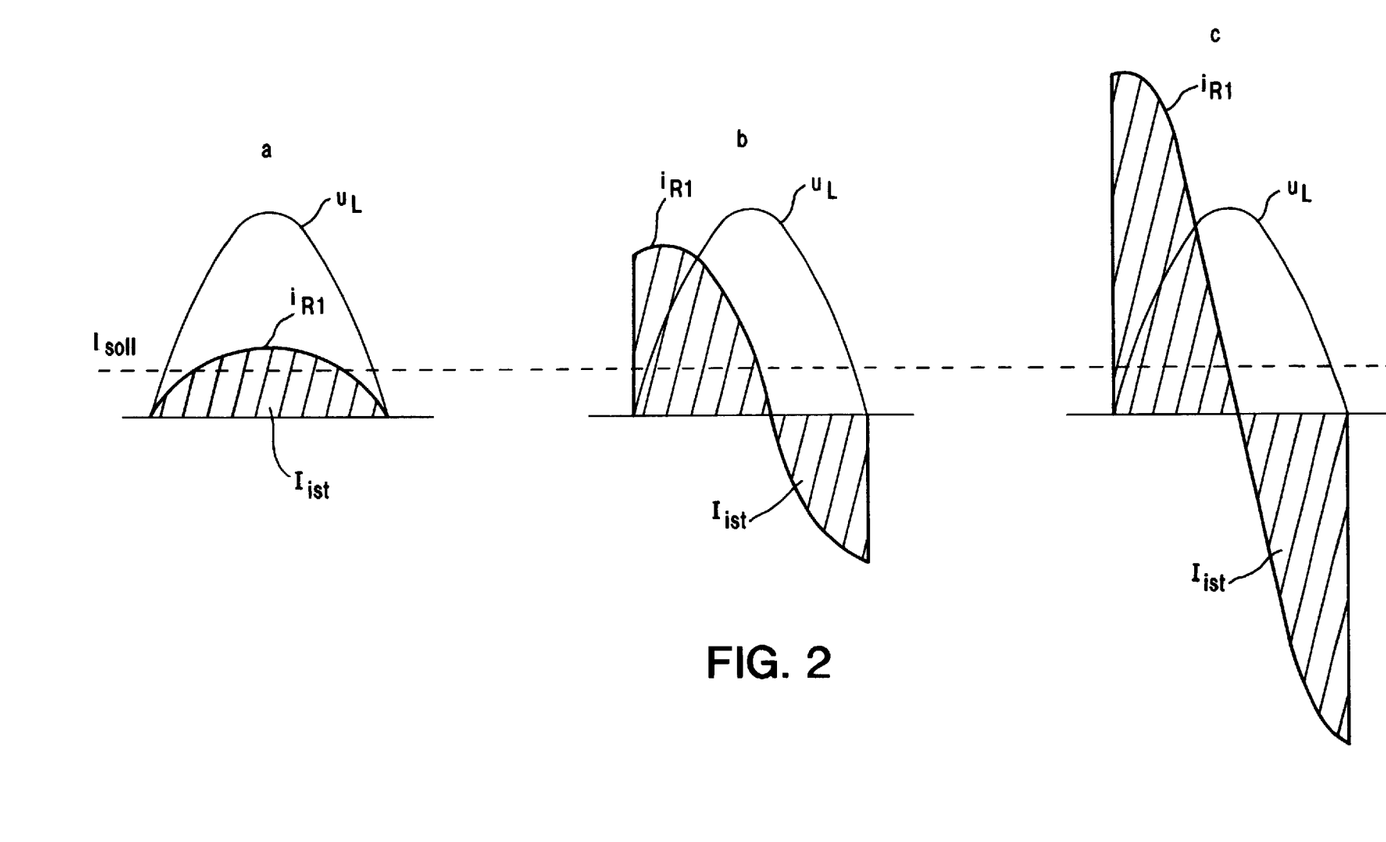
FIG. 2 shows current- and voltage characteristics in explanation of second exemplary embodiment according to the invention.

FIG. 2 shows the corresponding current- and voltage characteristics in explanation of the second exemplary embodiment according to the invention. FIG. 2a again shows the characteristics for a negligible capacitive current across the line capacitance C7, while FIGS. 2b and 2c show the signal characteristics for an average line capacitance and a very high line capacitance.

In accordance with the second exemplary embodiment of the method according to the invention, it is proposed that the mean value of the current $i_{R1}$ measured across the resistor R1 be formed during a half wave of the lamp voltage $u_L$. Thus the arithmetic mean value of the current $i_{R1}$ during a half wave of the lamp voltage $u_L$ is calculated as actual value $I_{ist}$ of the lamp current $i_L$ which serves as regulating variable for the frequency and/or duty factor of the inverter. It can be seen from FIG. 2 that, as a result of the current-voltage shift caused by the line capacitance C7, the thus measured mean value, i.e. $I_{ist}$, follows the cosine of the shift angle $\beta$ illustrated in FIG. 1b during the positive half wave of the lamp voltage $u_L$. Thus $$I_{ist} \sim \cos \beta \qquad (5).$$

For the extreme value $\beta = 0°$, the whole of the shaded area above the zero line is the gauge of the actual value $I_{ist}$ of the lamp current $i_L$, while for $\beta = \pi/2$, the areas above and below the zero line are equal in size and thus the arithmetic mean value, i.e. $I_{ist}$, is zero. Between these two extreme values for $I_{ist}$ there always remains a positive area component, and thus a corresponding mean value, which is evaluated as actual value list of the lamp current $I_L$ and is used as regulating variable for the brightness of the gas discharge lamp.

It can be seen from FIG. 2 that, due to the arithmetic mean value formation, it is possible to eliminate the capacitance current component $i_{C7}$ produced by the parasitic line capacitance C7, whereby accurate dimming of the gas discharge lamp over a wide dimming range is possible. In particular, in the case of the second exemplary embodiment of the method according to the invention illustrated in FIG. 2 it is also possible to arrive at the correct actual value $I_{ist}$ as regulating variable for the inverter by measuring the phase shift between the current $i_{R1}$ and the lamp voltage $u_L$.

A common feature of the methods illustrated in FIGS. 1 and 2 is that always only the actual active component of the lamp current is evaluated. With a complex lamp current this means that only the real component of the lamp current is used for the regulation of the operating state.

Figure 3:
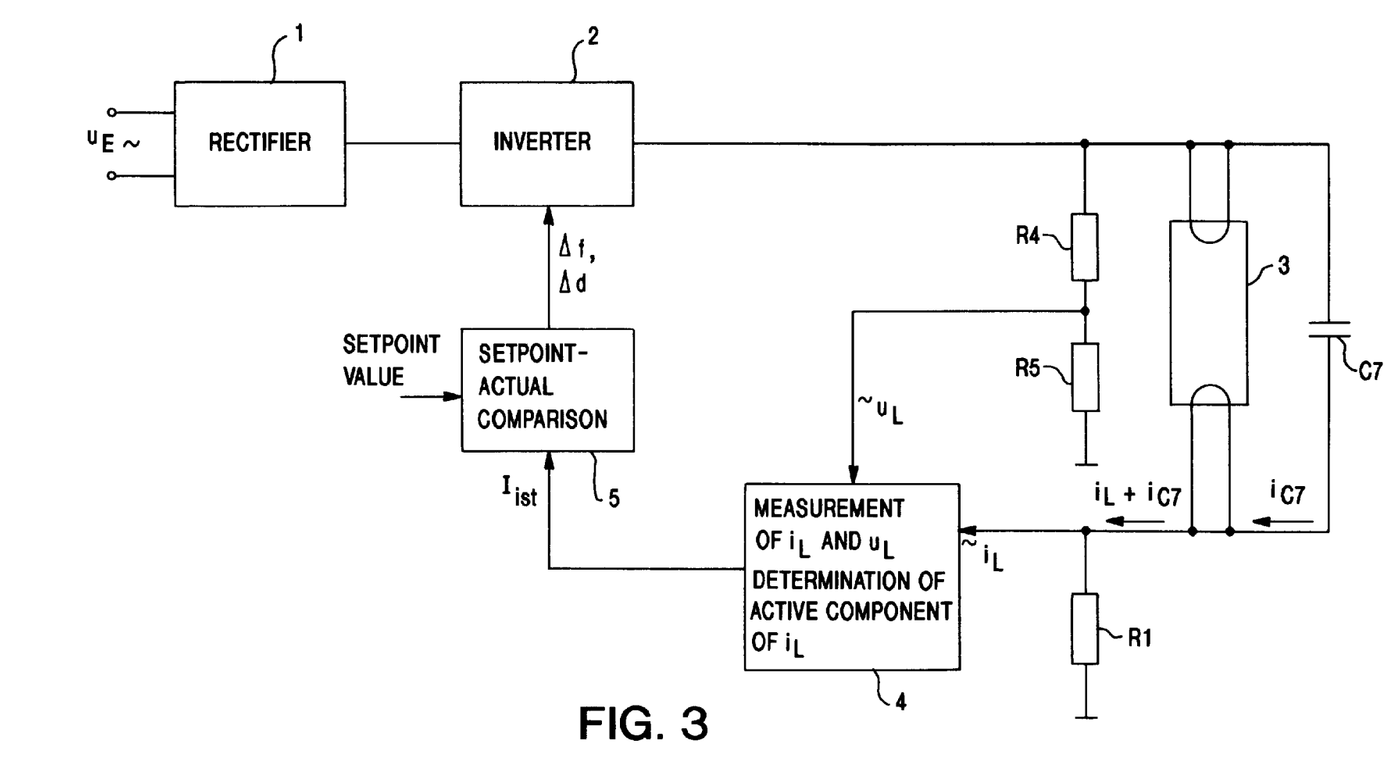
FIG. 3 schematically illustrates an electronic control gear according to the invention.

FIG. 3 is a simplified block circuit diagram of an electronic control gear according to the invention which is used in particular for the implementation of the method according to the invention. In addition to the circuit elements already shown in FIG. 5, a device 4 for measuring the voltage $u_L$ and the current $i_{R1}$ flowing across the resistor R1 is additionally provided. A measured variable proportional to the lamp voltage $u_L$ is tapped between the resistors R4 and R5 and fed to the device 4. As already described with reference to FIG. 5, via the shunt resistor R1 a measured variable proportional to the lamp current $i_L$ is tapped and fed to the device 4. On the basis of the supplied signal characteristics, the device 4 calculates the actual active component of the lamp current, i.e. in accordance with the previously described exemplary embodiments of the method according to the invention the device 4 calculates the actual value $I_{ist}$ of the lamp current $I_L$ corrected in relation to the capacitive component $i_{C7}$. This actual value $I_{ist}$ is fed to a device 5 which subjects the calculated actual value $I_{ist}$ to a setpoint-actual comparison with a setpoint value, i.e. a predetermined setpoint value $I_{ist}$. As a function of this setpoint-actual comparison, the frequency f and/or duty factor d of the inverter 2 is changed in order to regulate the brightness of the gas discharge lamp 3. Alternatively however, it can also be provided that the actual value list calculated by the device 4 be fed directly to the inverter 2.

It should be noted that $u_L$ and $i_L$ can also be measured by a device separate from the device 4. Equally, one or several other reference variables can be used instead of $u_L$. For example, the actuation time(s) of the switches of the inverter 2 could also be used as reference variable as the current- and voltage characteristic of a given circuit arrangement is predictable. Thus for example it can be specified that the current be measured after a certain time interval following the switching-on of the one inverter switch. If the time interval is selected such that the current measurement takes place at the time of the voltage maximum, the measured current corresponds to the actual active component of the lamp current. It is also possible to form the mean value of the measured current between the switching-on and off of a switch of the inverter 2.

Figure 4A:
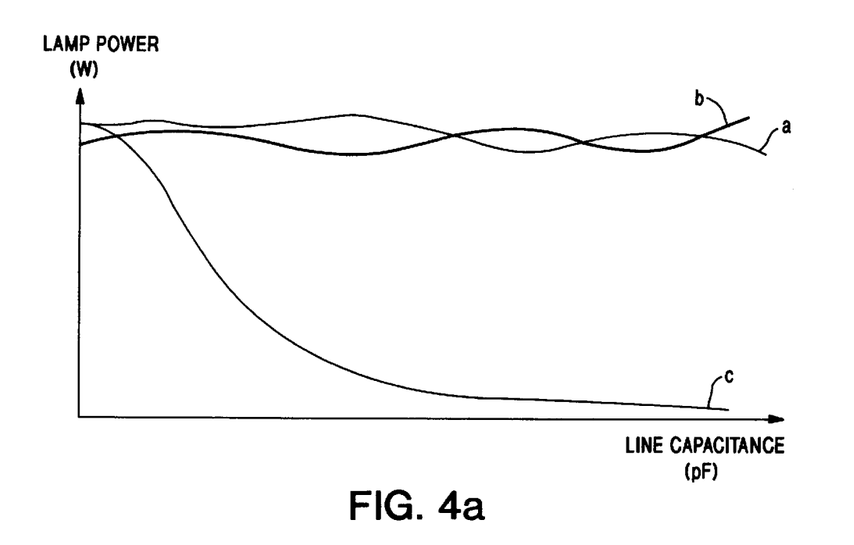
FIGS. 4a and 4b are diagrams comparing the methods according to the invention with the known regulation method.
Figure 4B:
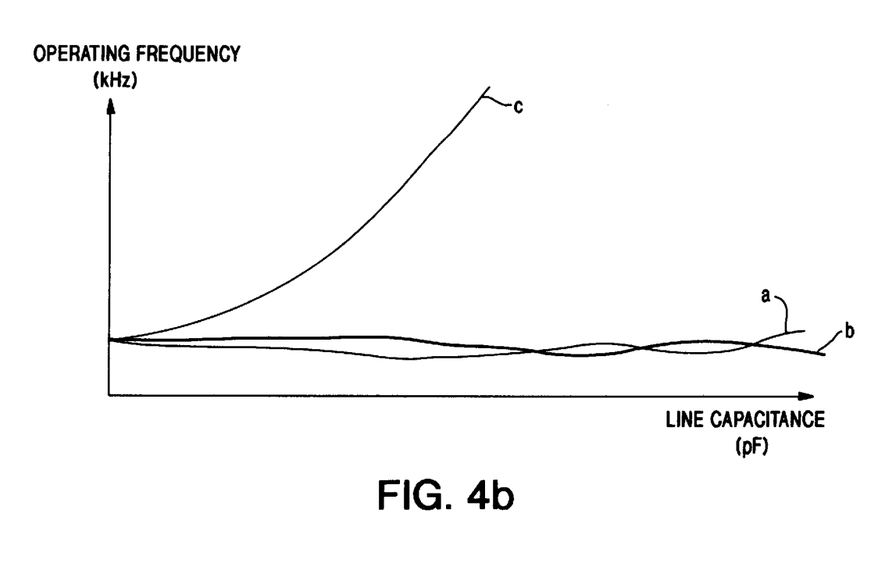

FIGS. 4a and 4b are diagrams comparing the known regulation method with the regulation method according to the invention. FIG. 4a illustrates the lamp power as a function of the value of the parasitic line capacitance. It can be seen that, as already described, the characteristic referenced c and corresponding to the known regulation method is highly dependent upon the line capacitance, whereas the characteristics referenced a and b of the first and second exemplary embodiment respectively of the method according to the invention are virtually independent of the line capacitance. It can also be seen from FIG. 4b that in the case of the known regulation method the operating frequency is distinctly influenced by the line capacitance (compare characteristic c), while in the case of the methods according to the invention an operation which is virtually independent of the line capacitances is possible (compare characteristics a and b). It should be noted that the characteristics illustrated in FIGS. 4a and 4b have been shown for constant resistance values of the lamp. For larger lamp resistance values it was found that the characteristics a and b according to the invention are downwardly displaced, while the characteristics c of the known regulation method remain substantially unchanged.

Finally it should be noted that the regulation methods according to the invention are additionally advantageous when rapid ignition recognition is to take place. Such rapid ignition recognition is particularly advantageous when the gas discharge lamp is to be dimmed in its brightness as rapidly as possible after its ignition. Especially when a lamp is to be started with low brightness, the capacitive current component $i_{C7}$ produced by the parasitic line capacitance C7 is problematic since, in order to be able to increase the output frequency of the inverter for dimming the gas discharge lamp immediately after the ignition of the gas discharge lamp, upon the detection of a current flowing across the shunt resistor R1 it is concluded that the gas discharge lamp has successfully ignited. In the known regulation method, errors can arise in that the capacitive current component $i_{C7}$ flows across the capacitive line capacitance C7 even when the gas discharge lamp has not ignited, which could be incorrectly interpreted as the lamp current produced by the ignition of the gas discharge lamp. As however, by the use of the regulation methods according to the invention, the measured actual value now is virtually independent of the influences of the line capacitance C7, on the basis of the actual value of the current across the resistor R1 calculated in accordance with the invention it is possible to reliably conclude, upon the overshooting of a precisely definable threshold, that the gas discharge lamp has successfully ignited.

The method and the control circuit according to the invention can also be applied to the electronic control gear described in EP-A1-0 338 109 referred to in the introduction, which comprises an ignition- and heating capacitor arranged in parallel to the gas discharge path of the lamp. In spite of the parallel connected heating capacitor, in accordance with the invention the actual lamp current can be measured. The consequence of this is that, in the non-dimmable arrangement described in EP-A1-0 338 109, component tolerances and environmental influences (such as e.g. the environmental temperature) upon the lamp which would affect the regulation accuracy, are eliminated by the use of the invention.

In general the invention, and the advantages thereof explained in detail in the foregoing, can be applied both to dimmable and to non-dimmable devices. In particular, the device can also be applied to electronic control gears which comprise externally commutated inverters and which thus require to be regulated.

We claim:

1. A method for regulating the operating behavior of at least one gas discharge lamp, which is operated by means of an electronic control circuit, said method comprising the steps of:

measuring current flowing through said lamp;

calculating an active component of said current, which is uninfluenced by parasitic capacitance, by comparing the relative phases of the measured current and a voltage applied to said lamp; and regulating the operation of said lamp based on said active component.

2. A method according to claim 1, characterized in that the frequency (f) and/or duty factor (d) of an a.c. voltage source connected to the gas discharge lamp is changed as a function of the active component.

3. A method according to claim 1, characterized in that during a half wave of the lamp voltage ($U_L$) the arithmetic mean value of the lamp current ($i_L$) is formed, and that the actual value of the arithmetic mean value of the lamp current ($i_L$) is used as regulating variable.

4. A method according to claim 3, characterized in that the lamp current ($i_L$) is measured via a shunt resistor (R1) connected in series with the gas discharge lamp.

5. A method according to claim 3, characterized in that the brightness of the gas discharge lamp is regulated.

6. A method according to claim 1, characterized in that the lamp current ($i_L$) is measured at the time at which the lamp voltage ($U_L$) has reached its positive peak value and that the actual value of the lamp current ($I_{ist}$) acquired therefrom is used as regulating variable.

7. A method according to claim 6, characterized in that the lamp current ($i_L$) is measured via a shunt resistor (R1) connected in series with the gas discharge lamp.

8. A method according to claim 6, characterized in that the brightness of the gas discharge lamp is regulated.

9. A method according to claim 1, characterized in that the variable corresponding to the active component of the lamp current ($i_L$) is derived from the actuation of at least one controllable switch of an electronic control gear which serves to operate the at least one gas discharge lamp.

10. A method according to claim 9, characterized in that following the switching-on of the at least one controllable switch of the electronic control gear, the current is measured at the time of the voltage maximum and is used as the variable corresponding to the active component of the lamp current ($i_L$).

11. A method according to claim 9, characterized in that between the switching-on and switching-off of the at least one controllable switch, the mean value of the current is formed and is used as the variable corresponding to the active component of the lamp current ($i_L$).

12. A method for measuring and evaluating the operating state of at least one gas discharge lamp, said method compressing the steps of:

measuring at least one variable corresponding to current flowing through said lamp;

calculating an active component of the measured current, which is uninfluenced by parasitic capacitance, by ascertaining its phase in relation to a reference; and evaluating the operating state of said lamp based on said active current.

13. A method according to claim 12, characterized in that the frequency (f) and/or duty factor (d) of an a.c. voltage source connected to the gas discharge lamp is changed as a function of the active component.

14. A method according to claim 12, characterized in that the lamp current ($i_L$) is measured at the time at which the lamp voltage ($U_L$) has reached its positive peak value and that the actual value of the lamp current ($I_{ist}$) acquired therefrom is used as regulating variable.

15. A method according to claim 14, characterized in that the lamp current ($i_L$) is measured via a shunt resistor (R1) connected in series with the gas discharge lamp.

16. A method according to claim 14, characterized in that the brightness of the gas discharge lamp is regulated.

17. A method according to claim 12, characterized in that during a half wave of the lamp voltage ($U_L$) the arithmetic mean value of the lamp current ($i_L$) is formed, and that the actual value of the arithmetic mean value of the lamp current ($i_L$) is used as regulating variable.

18. A method according to claim 17, characterized in that the lamp current ($i_L$) is measured via a shunt resistor (R1) connected in series with the gas discharge lamp.

19. A method according to claim 17, characterized in that the brightness of the gas discharge lamp is regulated.

20. A method according to claim 17, characterized in that the variable corresponding to the active component of the lamp current ($i_L$) is derived from the actuation of at least one controllable switch of an electronic control gear which serves to operate at least one gas discharge lamp.

21. A method according to claim 20, characterized in that following the switching-on of at least one controllable switch of the electronic control gear, the current is measured at the time of the voltage maximum and is used as the variable corresponding to the active component of the lamp current ($i_L$).

22. A method according to claim 20, characterized in that between the switching-on and switching-off of at least one controllable switch, the mean value of the current is formed and is used as the variable corresponding to the active component of the lamp current ($i_L$).

23. In an electronic control circuit for controlling at least one gas discharge lamp with a voltage source having at least one of a variable output frequency and a variable duty factor:
   a device for measuring the lamp voltage ($U_L$) and the lamp current ($i_L$); and
   a device connected and arranged to produce a control output corresponding to an active component of a determined active component of the lamp current which is based on the relative phases of the measured lamp voltage and the measured lamp current.

24. An electronic control circuit according to claim 23, characterized in that the device for measuring the lamp current ($i_L$) is a shunt resistor (R1).

25. An electronic control circuit according to claim 23, characterized in that the device for determining the active component of the lamp current ($i_L$) calculates a regulating variable, which is a function of the active component, for the operating behavior, in particular the brightness, of the gas discharge lamp.

26. An electronic control circuit according to claim 25, characterized in that the regulating variable is the actual value ($I_{ist}$) of the measured lamp current ($i_L$) at the time at which the lamp voltage ($U_L$) has reached its positive peak value.

27. An electronic control circuit according to claim 25, characterized in that the regulating variable is the actual value of the arithmetical mean value of the measured lamp current ($i_L$) during a half wave of the lamp voltage ($U_L$).

28. An electronic control circuit according to claim 25, characterized in that the variable voltage source is an inverter and that the regulating variable can be fed to the inverter either directly or via a device for the setpoint-actual comparison of the actual value with a setpoint value.

29. An electronic control circuit according to claim 28, characterized in that the frequency (f) and/or duty factor (d) of the inverter can be changed as a function of the regulating variable.

* * * * *